United States Patent
Khodakovsky et al.

(10) Patent No.: US 8,228,337 B1
(45) Date of Patent: *Jul. 24, 2012

(54) SYSTEM AND METHOD FOR TEMPORAL LOAD BALANCING ACROSS GPUS

(75) Inventors: Andrei Khodakovsky, Belmont, CA (US); Franck R. Diard, Mountain View, CA (US)

(73) Assignee: NVIDIA Corporation, Santa Clara, CA (US)

(*) Notice: Subject to any disclaimer, the term of this patent is extended or adjusted under 35 U.S.C. 154(b) by 964 days.

This patent is subject to a terminal disclaimer.

(21) Appl. No.: 12/245,650

(22) Filed: Oct. 3, 2008

(51) Int. Cl.
*G06F 15/16* (2006.01)
*G06T 15/40* (2011.01)
*G09G 5/00* (2006.01)

(52) U.S. Cl. .................... 345/502; 345/422; 345/620

(58) Field of Classification Search .................. None
See application file for complete search history.

(56) References Cited

U.S. PATENT DOCUMENTS

| | | | |
|---|---|---|---|
| 6,268,875 B1 | 7/2001 | Duluk, Jr. et al. | |
| 7,053,901 B2 | 5/2006 | Huang et al. | |
| 7,075,541 B2 * | 7/2006 | Diard | 345/505 |
| 7,800,610 B2 * | 9/2010 | Bakalash et al. | 345/419 |
| 2006/0209078 A1 | 9/2006 | Anderson et al. | |
| 2006/0221086 A1 | 10/2006 | Diard | |
| 2008/0186329 A1 | 8/2008 | Hunter | |

OTHER PUBLICATIONS

Emil Persson; Depth In-depth; AMD, Inc., 2007.*
OpenGL; OpenGL FAQ / 22 Performance; http://web.archive.org/web/20040205174334/http://www.opengl.org/resources/faq/technical/performance.htm; catured by the Internet Archive on Feb. 2004.*
Rajagopaln et al., Functionality Distribution for Parallel Rendering; Proceedings of the 19th IEEE International Parallel and Distributed Processing Symposium (IPDPS'05); Apr. 2005.*

* cited by examiner

*Primary Examiner* — Kee M Tung
*Assistant Examiner* — Carlos Perromat
(74) *Attorney, Agent, or Firm* — Patterson & Sheridan, LLP

(57) ABSTRACT

One embodiment of the present invention sets forth a method for dynamically load balancing rendering operations across an IGPU and a DGPU. For each frame, the graphics driver configures the IGPU to pre-compute Z-values for a portion of the display surface and to write feedback data to the system memory indicating the time that the IGPU used to process the frame. The graphics driver then configures the DGPU to use the pre-computed Z-values while rendering to the complete display surface and to write feedback data to the system memory indicating the time that the DGPU used to process the frame. The graphics driver uses the feedback data from the IGPU and DGPU in conjunction with the percentage of the display surface that the IGPU Z-rendered for the frame to scale the portion of the display surface that the IGPU Z-renders for one or more subsequent frames. In this fashion, overall processing within the graphics pipeline is optimized across the IGPU and DGPU.

20 Claims, 7 Drawing Sheets

SYSTEM AND METHOD FOR TEMPORAL LOAD BALANCING ACROSS GPUS

BACKGROUND OF THE INVENTION

1. Field of the Invention

The present invention relates generally to the field of graphics processing and more specifically to a system and method for temporal load balancing across graphics processing units (GPUs).

2. Description of the Related Art

A typical computing system includes a central processing unit (CPU), an input device, a system memory, one or more graphics processing units (GPUs), and one or more display devices. A variety of software application programs may run on the computing system. The CPU usually executes the overall structure of the software application program and configures the GPUs to perform specific tasks in the graphics pipeline. Some computing systems include both an integrated (IGPU) and a higher-performance discrete GPU (DGPU). Such a computing system may support a hybrid performance mode in which the IGPU is configured to supplement the performance of the DGPU, thereby increasing the efficiency of the graphics pipeline.

In one approach to implementing a hybrid performance mode, the IGPU runs one image frame ahead of the DGPU, rendering only depth of field values (ignoring all color information) to establish the closest surfaces to the viewer. While rendering, the IGPU maintains the minimum Z-value, which corresponds to the closest depth of field value, for each pixel in the image frame using a two-dimensional array known as a Z-buffer. The DGPU then renders the image frame with full shading (including color information) using the pre-computed Z-values to avoid rendering certain pixel fragments (i.e., the fragment of each pixel intersected by an object) in the image that would otherwise be occluded by closer geometries in the image being rendered. Ignoring the color information allows the IGPU to efficiently pre-compute Z-values, while starting with the pre-computed Z-values allows the DPGU to avoid unnecessary shading operations.

One drawback to this approach is that, since the DGPU uses the pre-computed Z-values that are generated by the IGPU, the IGPU must first be finished with a particular frame before the DGPU can begin processing that frame. In some computing systems, the IGPU is substantially less powerful than the DGPU. Consequently, the IGPU may take longer to pre-compute Z-values for a given frame than the DGPU takes to finish rendering the previous frame. In such situations, the IGPU may become a bottleneck in the graphics pipeline, thereby hindering overall system performance.

As the foregoing illustrates, what is needed in the art is a more reliable technique for using the IGPU to pre-compute Z-values for the DGPU that can be used to avoid the bottleneck problem set forth above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
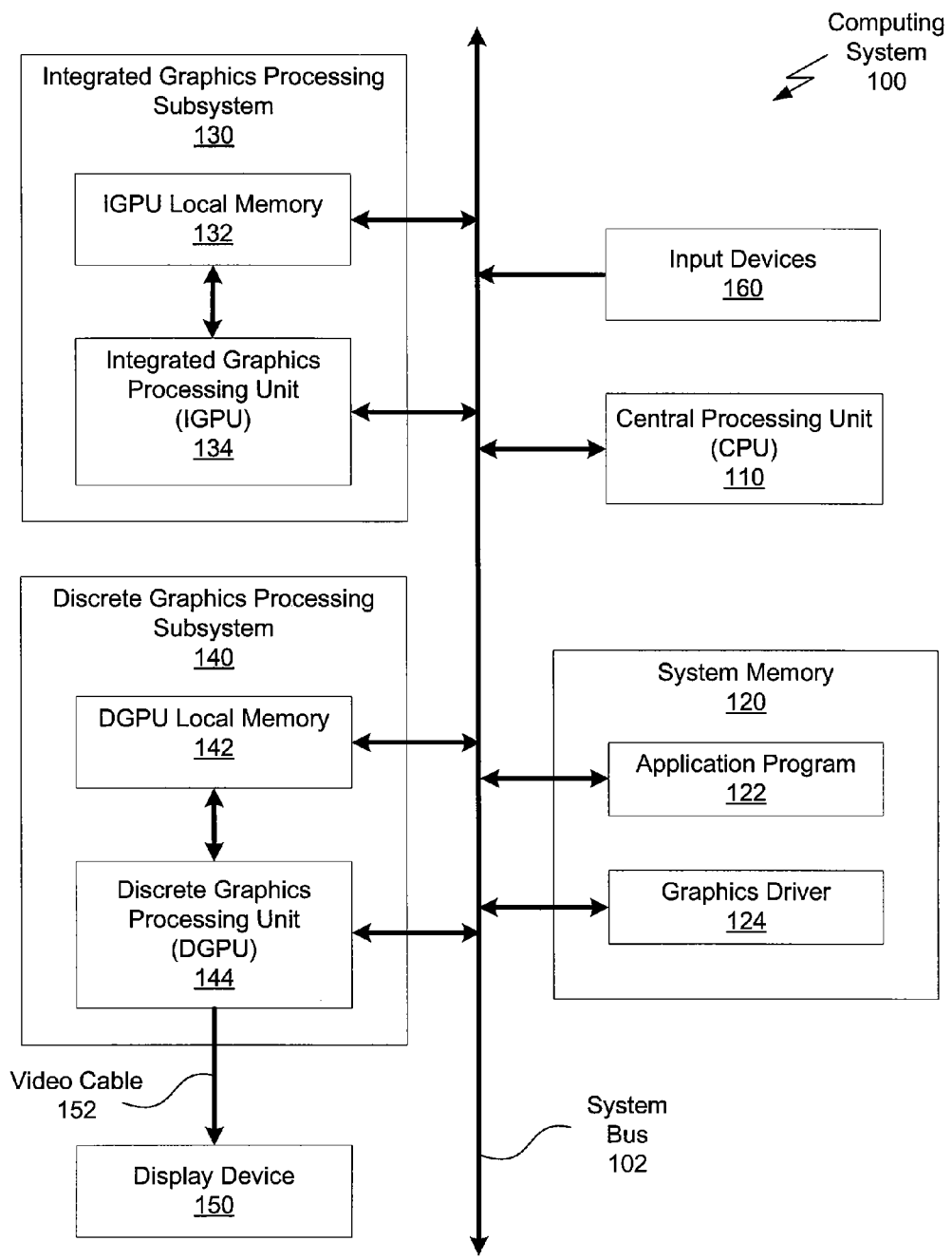
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a central processing unit (CPU) 110, input devices 160, a system memory 120, an integrated graphics processing subsystem 130, a discrete graphics processing subsystem 140, a video cable 152, and a display device 150. In alternate embodiments, the CPU 110 and portions of the integrated graphics processing subsystem 130 may be integrated into a single processing unit. Communication paths interconnecting the various components in FIG. 1 may be implemented using any suitable bus or point-to-point communication protocol(s), and connections between different devices may use different protocols as is known in the art.

The CPU 110 connects to the input devices 160, the system memory 120, the integrated graphics processing subsystem 130, and the discrete graphics processing subsystem 140 via a system bus 102. In alternate embodiments, the system memory 120 may connect directly to the CPU 110. The CPU 110 receives user input from the input devices 160, executes programming instructions stored in the system memory 120, operates on data stored in the system memory 120, and configures the integrated graphics processing subsystem 130 and the discrete graphics processing subsystem 140 to perform specific tasks in the graphics pipeline. Further, the CPU 110 may configure the integrated graphics processing subsystem 130 and the discrete graphics processing subsystem 140 to work together to perform specific tasks.

The system memory 120 typically includes dynamic random access memory (DRAM) used to store programming instructions and data for processing by the CPU 110, the integrated graphics processing subsystem 130, and the discrete graphics processing subsystem 140. The integrated graphics processing subsystem 130 and the discrete graphics processing subsystem 140 receive instructions that are transmitted by the CPU 110 and process the instructions in order to render graphics images. Subsequently, the discrete graphics processing subsystem 140 may transmit rendered graphics images through a video cable 152 to the display device 150. In alternate embodiments, there may be additional display devices connected to either the integrated graphics processing subsystem 130 or the discrete graphics processing subsystem 140.

The system memory 120 includes one or more application programs 122 and a graphics driver 124. The applications program 122 transmits instructions that are designed to operate within the integrated graphics processing subsystem 130 or the discrete graphics processing subsystem 140 to the graphics driver 124. The graphics driver 124 is configured to translate these instructions into machine code programs that execute on components within the integrated graphics processing subsystem 130 and the discrete graphics processing subsystem 140. The graphics driver 124 configures the integrated graphics processing subsystem 130 to run one frame ahead of the discrete graphics processing subsystem 140. More specifically, the graphics driver 124 configures the integrated graphics processing subsystem 130 to pre-compute Z-values for a portion of the pixels in each image and the discrete graphics processing subsystem 140 to render and display all of the pixels in each image, using the pre-computed Z-values to expedite the rendering process.

The integrated graphics processing subsystem 130 includes an integrated graphics processing unit (IGPU) 134 and an IGPU local memory 132. In one embodiment, the IGPU 134 is part of the main chipset that is wired into the motherboard of the computing system 100. The IGPU 134 receives instructions transmitted from the graphics driver 124 and processes the instructions in order to pre-compute Z-values. The IGPU 134 stores data in the IGPU local memory 132 and transmit Z-values to the system memory 120 using a DMA engine (not shown). The IGPU 134 may be provided with any amount of IGPU local memory 132 and may use both the IGPU local memory 132 and the system memory 120. Further, in alternate embodiments, the IGPU local memory 132 may be incorporated into the system memory 120. The DMA engine may be implemented in any technically feasible fashion. For example, the DMA engine may be incorporated into the CPU 110 or may be part of the main chipset that is wired into the motherboard of the computing system 100.

The computing system 100 also includes the discrete graphics processing subsystem 140. The discrete graphics processing subsystem 140 includes a discrete graphics processing unit (DGPU) 144 and a DGPU local memory 142. The discrete graphics processing subsystem 140 may be part of a discrete graphics card that is connected to the motherboard of the computing system 100 via an expansion slot (e.g., PCI Express or Accelerated Graphics Port). The discrete graphics processing subsystem 140 typically has higher performance and a richer graphics feature set than the integrated graphics processing subsystem 130. The DGPU 144 receives instructions transmitted from the graphics driver 124, processes the instructions in order to render graphics images, and stores these images in the DGPU local memory 142. The DGPU 144 may be provided with any amount of DGPU local memory 142 and may use both the DGPU local memory 142 and the system memory 120. Further, the DGPU 144 displays certain graphics images on the display device 150 that is connected to the discrete graphics processing subsystem 140 via the video cable 152. The display device 150 is an output device capable of emitting a visual image corresponding to an input graphics image. For example, the display device 150 may be built using a cathode ray tube (CRT) monitor, a liquid crystal display (LCD), or any other suitable display system.

In some embodiments, the computing system 100 may include specialized hardware that may be used to transfer the Z-buffer directly from the IGPU local memory 132 to the DGPU local memory 142. After the Z-buffer is transferred to the DGPU local memory 142, the DGPU 144 may access the pre-computed Z-values in the Z-buffer.

Figure 2:
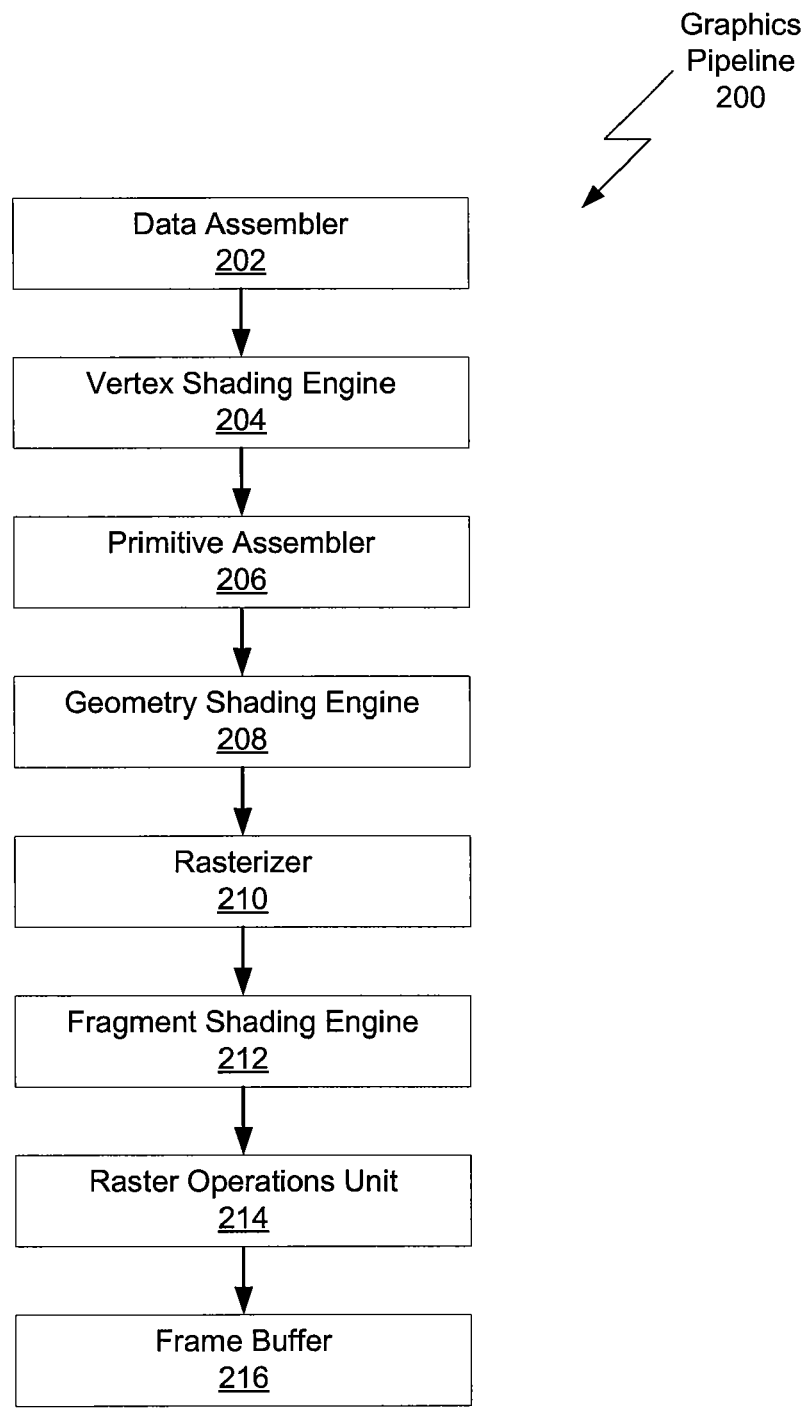
FIG. 2 is a conceptual diagram of a programmable graphics pipeline residing within each of the GPUs of FIG. 1, according to one embodiment of the invention.

FIG. 2 is a conceptual diagram of a programmable graphics pipeline 200 residing within the each of the GPUs 134 and 144 of FIG. 1, according to one embodiment of the invention. The graphics pipeline 200 is configured to transform 3-D images into 2-D images. As shown, the graphics pipeline 200 includes a data assembler 202, a vertex shading engine 204, a primitive assembler 206, a geometry shading engine 208, a rasterizer 210, a fragment shading engine 212, a raster operations unit 214, and a frame buffer 216.

The data assembler 202 is a fixed-function unit that collects vertex data from the application program 122 for high-order surfaces, primitives, and the like, and passes the vertex data to the vertex shading engine 204. The data assembler 202 may gather data from buffers stored within the system memory 120 and the associated local memory (i.e., the IGPU local memory 132 or the DGPU local memory 142) as well as from API calls from the application program 122 used to specify vertex attributes. The vertex shading engine 204 is a programmable execution unit that is configured to execute a machine code vertex shading program, processing vertex data as specified by the vertex shading program. For example, the vertex shading engine 204 may be programmed to transform the vertex data from an object-based coordinate representation (object space) to an alternatively based coordinate system such as world space or normalized device coordinates (NDC) space. The vertex shading engine 204 may access data that is stored in the associated local memory.

The primitive assembler 206 is a fixed-function unit that receives processed vertex data from the vertex shading engine 204 and constructs graphics primitives, e.g., points, lines, triangles, or the like, for processing by the geometry shading engine 208. In alternative embodiments, a second primitive assembler (not shown) may be included subsequent to the geometry shading engine 208 in the data flow through the GPU. The geometry shading engine 208 is a programmable execution unit that is configured to execute a machine code geometry shading program, processing graphics primitives received from the primitive assembler 206 as specified by the geometry shading program. For example, in addition to well-known per-primitive operations such as clipping, the geometry shading engine 208 may be programmed to generate one or more new graphics primitives and calculate parameters, such as plane equation coefficients, that are used to rasterize the new graphics primitives. The geometry shading engine 208 may access data that is stored in the associated local memory. The geometry shading engine 208 outputs the parameters and new graphics primitives to the rasterizer 210.

The rasterizer 210 is a fixed-function unit that scans the new graphics primitives and outputs fragments, each containing fragment data, which may include raster position, depth or interpolated vertex attributes, such as texture coordinates and opacity, to the fragment shading engine 212. The fragment shading engine 212 is a programmable execution unit that is configured to execute a machine code fragment shading program, processing fragments received from the rasterizer 210 as specified by the machine code fragment shading program. For example, the fragment shading engine 212 may be programmed to perform operations such as perspective correction, shading, blending, and the like, to produce shaded fragments that are output to the raster operations unit 214. Further, the fragment shading engine 212 may be programmed to iterate across groups of pixels. The fragment shading engine 212 may access data that is stored in buffers in the associated local memory. The raster operations unit 214 optionally performs fixed-function computations such as near and far plane clipping and raster operations, such as stencil, z test, blending and the like, and outputs pixel data as processed graphics data for storage in a buffer in the associated local memory, such as a frame buffer 216.

The frame buffer 216 stores data for at least one two-dimensional surface that may be used to drive the display device 150. Furthermore, the frame buffer 216 may include more than one two-dimensional surface so that the GPUs 134 and 144 can render to one two-dimensional surface while a second two-dimensional surface is used to drive the display device 150.

Figure 3:
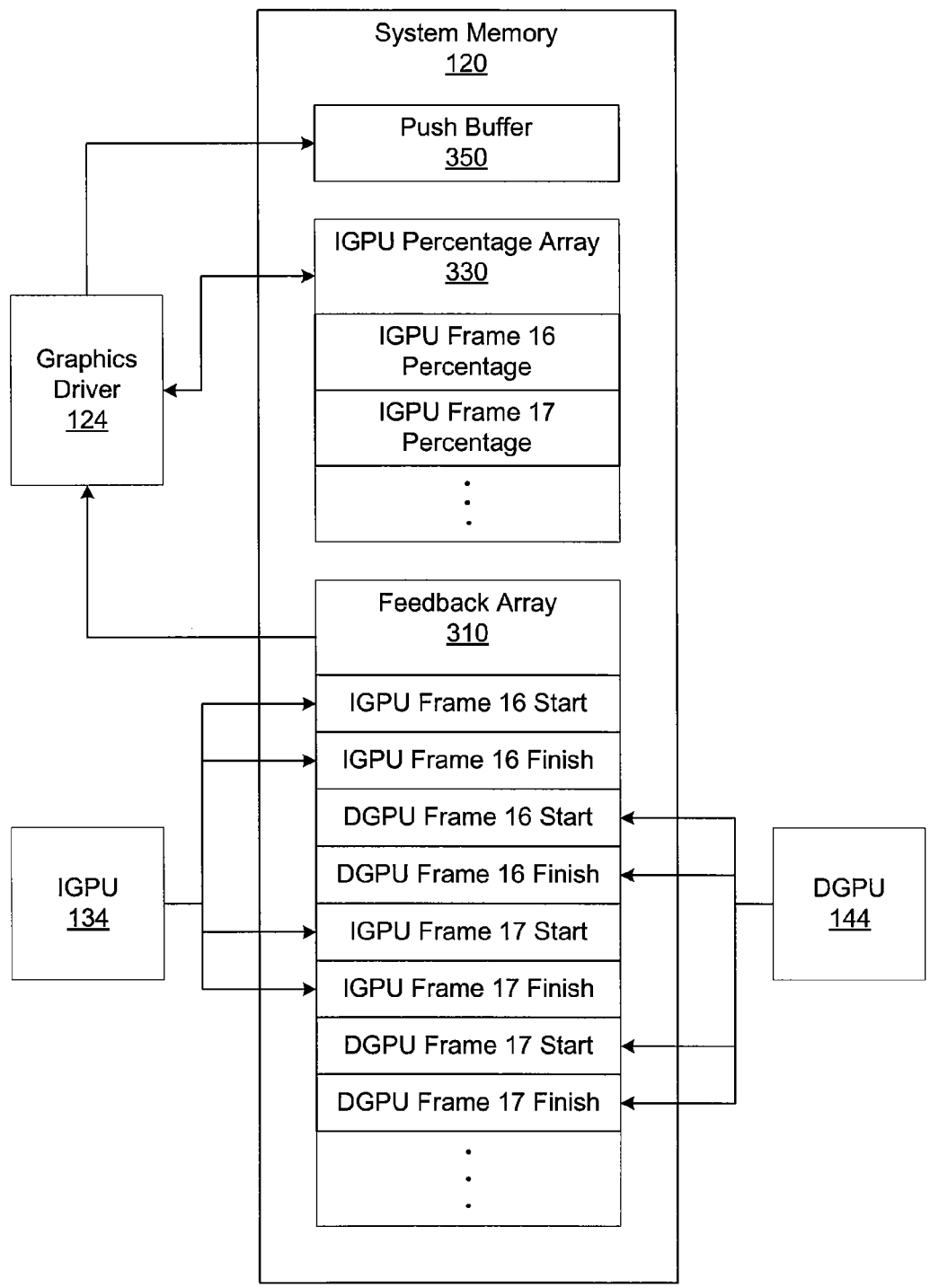
FIG. 3 is a conceptual diagram of the graphics driver, the GPUs, and the system memory of FIG. 1, according to one embodiment of the invention.

FIG. 3 is a conceptual diagram of the graphics driver 124, the GPUs 134 and 144, and the system memory 120 of FIG. 1, according to one embodiment of the invention. Among other things, the graphics driver 124 uses the system memory 120 to store data used to configure the IGPU 134 and the DGPU 144. The system memory 120 includes one or more push buffers 350, a feedback array 310 and an IGPU percentage array 330. The graphics driver 124 uses the push buffer 350 to configure the IGPU 134 and the DGPU 144, and uses the feedback array 310 and the IGPU percentage array 330 to facilitate the temporal load balancing process.

For each frame, the graphics driver 124 generates the single push buffer 350. The push buffer 350 includes a stream of commands designed to configure the IGPU 134 and the DGPU 144 to work together to implement the graphics calls from the application programs 122 to render and display a particular frame. First, the graphics driver 124 configures the IGPU 134 to process the push buffer 350. After the IGPU 134 has finished processing the push buffer 350, the graphics driver 124 configures the DGPU 144 to process the push buffer 350. Consequently, the IGPU 134 runs one image frame ahead of the DGPU 144. Furthermore, some of the commands in the push buffer 350 target both the IGPU 134 and the DGPU 144, while other commands target only one of the IGPU 134 or the DGPU 144. Commands in the push buffer 350, such as "set device mask" commands, may be used to assign subsequent push buffer commands to one or more of the GPUs 134 and 144.

Using the push buffer 350 enables the graphics driver 124 to buffer one or more frames. Buffering the frames allows the CPU 110 to work independently of the IGPU 134 and the DGPU 144, thereby optimizing the overall system performance. As is well-known, the operating system included in the computing system 100 typically limits the number of frames that the graphics driver 124 may buffer. Thus, the graphics driver 124 may buffer any number of frames subject to the constraint imposed by the operating system.

In alternate embodiments, the graphics driver may configure the IGPU using one push buffer and the DGPU using another push buffer. In other embodiments, the graphics driver may communicate with the IGPU and the DGPU in any technically feasible manner, such as inserting different commands into the push buffer or employing a communication technique other than a push buffer.

For each frame, the graphics driver 124 configures the IGPU 134 to write an IGPU frame start time stamp to the feedback array 310 immediately before processing the frame and an IGPU frame finish time stamp to the feedback array 310 immediately after processing the frame. Similarly, for each image frame, the graphics driver 124 configures the DGPU 144 to write a DGPU frame start time stamp to the feedback array 310 immediately before processing the frame and a DGPU frame finish time stamp to the feedback array 310 immediately after processing the frame. Subsequently, this data enables the graphics driver 124 to compare the amount of time that the IGPU 134 takes to pre-compute Z-values for a particular frame to the amount of time that the DGPU 144 takes to render that frame using the pre-computed Z-values.

For example, the IGPU 134 writes an IGPU frame sixteen start time to the feedback array 310 immediately before processing frame sixteen and an IGPU frame sixteen finish time to the feedback array 310 immediately after processing frame sixteen. Subsequently, the DGPU 144 writes a DGPU frame sixteen start time to the feedback array 310 immediately before processing frame sixteen and an DGPU frame finish time to the feedback array 310 immediately after processing frame sixteen. After the DGPU 144 has rendered frame sixteen, the graphics driver 124 subtracts the IGPU frame sixteen start time from the IGPU frame sixteen finish time to determine the total amount of time that the IGPU 134 used to process frame sixteen. Similarly, the graphics driver 124 subtracts the DGPU frame sixteen start time from the DGPU frame sixteen finish time to determine the total amount of time that the DGPU 144 used to process frame sixteen.

The graphics driver 124 may allocate and implement the feedback array 310 in any technically feasible fashion. For example, the graphics driver 124 may allocate the feedback array 310 as a linear array with enough memory to simultaneously hold sixty-four time stamps (corresponding to the temporal data for sixteen completed frames). The graphics driver 124 may further configure the feedback array 310 as a rolling queue. In other words, the graphics driver 124 may program the GPUs 134 and 144 to store the temporal data for the first sixteen frames in discrete locations and then program the GPUs 134 and 144 to overwrite the temporal data for the first frame with the temporal data for the seventeenth frame. In alternate embodiments, the feedback array may be implemented using any technically feasible data structure and may store data for any number of frames.

Further, in other embodiments, the graphics driver may configure the GPUs to store any type of feedback data in the feedback array. Again, the graphics driver may use this feedback data in any technically feasible fashion to tune the work distribution between the GPUs. For example, the graphics driver may configure the IGPU to write a value of one to a particular location in the feedback array after the IGPU finishes processing frame n. Similarly, the graphics driver may configure the DGPU to write a value of two to the same location in the feedback array after the DGPU finishes processing frame n−1 (i.e., the frame immediately proceeding frame n). Subsequently, the graphics driver may access this location in system memory to determine whether the IGPU finished processing frame n before the DGPU finished processing frame n−1. The graphics driver may then use this information to redistribute the work between the IGPU and the DGPU for one or more subsequent frames.

The graphics driver 124 also allocates and uses the IGPU percentage array 330 as part of the temporal load balancing process. Before configuring the IGPU 134 and the DGPU 144 to render a particular frame, the graphics driver 124 calculates an IGPU percentage for that frame and stores the IGPU percentage in the IGPU percentage array 330. The IGPU percentage specifies the percentage of the pixels included in the two-dimensional display surface of the display device 150 in FIG. 1 for which the IGPU 134 calculates Z-values. For example, if the IGPU percentage for a particular frame is 84%, then the graphics driver 124 configures the IGPU 134 to compute Z-values for 84% of the pixels in the display surface. The graphics driver 124 further configures the IGPU 134 to set the Z-values corresponding to the remaining pixels to the Z-clear value (representing the farthest possible depth of field value). Reducing the IGPU percentage for a particular frame reduces the number of operations that the IGPU 134 executes to process the frame. And, since the DGPU 144 uses the pre-computed Z-values to expedite the rendering process, reducing the IGPU percentage for a particular frame increases the number of operations that the DGPU 144 has to execute to process the frame. Consequently, configuring the IGPU 134 using the IGPU percentage enables the graphics driver 124 to dynamically distribute the work between the IGPU 134 and the DGPU 144 for each frame.

The graphics driver 124 may configure the IGPU percentage array 330 to store the IGPU percentages for any number of frames. Again, the graphics driver 124 may implement the IGPU percentage array 330 in any technically feasible fashion, such as a rolling queue. For the initial frames (i.e., before temporal information for previous frames is available), the graphics driver 124 sets the IGPU percentage in any technically feasible fashion. For example, the graphics driver 124 may assign the IGPU percentage associated with the initial frames to 100%. After the IGPU 134 and the DGPU 144 have finished processing one or more frames, the graphics driver 124 then uses data stored in the feedback array 310 in conjunction with data stored in the IGPU percentage array 330 to calculate IGPU percentages for one or more subsequent frames. If the IGPU 134 took longer than the DGPU 144 to process a completed frame, then the graphics driver 124 determines an IGPU frame percentage for a subsequent frame that is less than the IGPU frame percentage for the completed frame. However, if the DGPU 144 took longer than the IGPU 134 to process a completed frame, and the IGPU percentage for the completed frame is less than one hundred percent, then the graphics driver 124 determines an IGPU frame percentage for a subsequent frame that is greater than the IGPU frame percentage for the completed frame.

Suppose, for example, the IGPU 134 and the DGPU 144 have both processed frame sixteen and the information in the feedback array 310 indicates that the ratio of the DGPU processing time for frame sixteen to the IGPU processing time for frame sixteen is 0.62. And suppose the IGPU percentage for frame sixteen is 84%. The graphics driver 124 would multiply the ratio of the DGPU processing time to the IGPU processing time for the frame (i.e., 0.62) by the IGPU percentage for the frame (i.e., 84%) to determine an IGPU percentage of 54% for the next frame that the graphics driver 124 configures the GPUs 134 and 144 to process. If the graphics driver 124 is buffering three frames, then the push buffer 350 that the graphics driver 124 generates to render frame twenty would include commands that configure the IGPU 134 to Z-render 54% of the pixels in frame twenty. Further, the graphics driver 124 would store 54% in the IGPU percentage array 330 in a location associated with frame twenty.

The graphics driver 124 takes into account a variety of other information and constraints when determining the IGPU percentage for each frame. In some embodiments, the graphics driver 124 may integrate information from more than one completed frame to calculate the IGPU percentage for each frame. For example, if the feedback array 310 and the IGPU percentage array 330 both contain information for sixteen completed frames, then the graphics driver 124 may calculate an IGPU percentage for each of these sixteen frames. The graphics driver 124 may then average these sixteen IGPU percentages to determine the IGPU percentage for the next frame that the graphics driver 124 configures the GPUs 134 and 144 to process.

The graphics driver 124 also takes into account any constraints imposed by the technique used to pre-compute and transfer Z-values between the GPUs 134 and 144. As described in greater detail herein, to facilitate transferring Z-values between the IGPU 134 and the DGPU 144, in one embodiment, the graphics driver 124 partitions the display surface into M-by-N rectangular tiles of pixels. Only one conservative Z-value is transferred from the IGPU 134 to the DGPU 144 for each tile in the display surface. Consequently, if the Z-value for any of the pixels included in a particular tile is the Z-clear value, then the Z-value representing that tile will be the Z-clear value. Therefore, to optimize the performance of the IGPU 134, the graphics driver 124 may reduce the IGPU percentage to ensure that the IGPU 134 pre-computes Z-values for either all of the pixels in a tile or none of the pixels in a tile.

Figure 4:
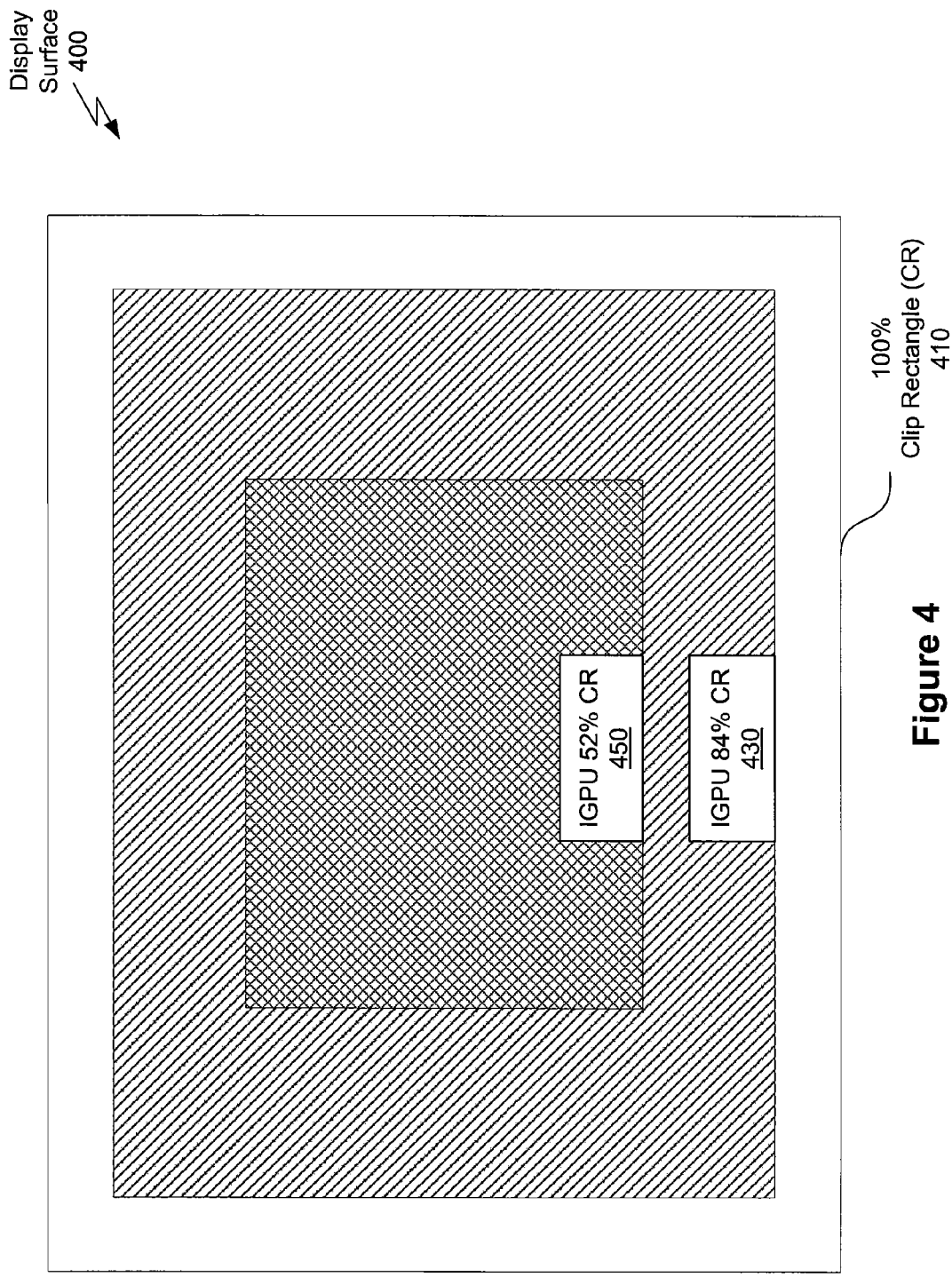
FIG. 4 is a conceptual diagram of an exemplary display surface and clip rectangles encompassing various percentages of the display surface, according to one embodiment of the invention.

FIG. 4 is a conceptual diagram of an exemplary display surface 400 and clip rectangles 410, 430, and 450 encompassing various percentages of the display surface 400, according to one embodiment of the invention. The display surface 400 has a resolution of 1600-by-1200 pixels and is subdivided into tiles, each of which has a resolution of sixteen-by-sixteen pixels. Consequently, the display surface 400 has a resolution of 100-by-75 tiles. The tile size may be chosen in any technically feasible fashion, considering factors such as the bandwidth of the system memory 120 and the performance of the DGPU 144.

As is known to persons skilled in the art, the graphics driver 124 may use a "clip rectangle" command to define the boundaries of a rectangular region of a display surface. Subsequent graphics commands only affect pixels that lie within the boundaries of the rectangular region (i.e., within the clip rectangle). In other words, after the graphics driver 124 configures a particular GPU using a clip rectangle command, that GPU does not apply graphics commands to pixels that lie outside the clip rectangle until the graphics driver 124 re-configures that GPU using a new clip rectangle command. Advantageously, configuring a particular GPU using a clip rectangle command enables that GPU to cull graphics commands involving graphics objects (e.g., vertices, geometries, and pixels) that lie fully outside the clip rectangle.

For each frame, the graphics driver 124 initially configures the IGPU 134 to clear the Z-values for all of the pixels in the display surface 400 using the 100% clip rectangle 410. Subsequently, the graphics driver 124 configures the IGPU 134 to pre-compute Z-values for a particular IGPU percentage of the display surface 400 using a corresponding clip rectangle. As shown, an IGPU 84% clip rectangle 430 encompasses 84% of the pixels in the display surface 400. Similarly, an IGPU 52% clip rectangle 450 encompasses 52% of the pixels in the display surface 400. Furthermore, the IGPU 84% clip rectangle 430 encompasses 84% of the tiles in the display surface 400 and the IGPU 52% clip rectangle 450 encompasses 52% of the tiles in the display surface 400. In other words, all of the tiles spanning the display surface 400 are either fully inside or fully outside the IGPU clip rectangles 430 and 450. Finally, the graphics driver 124 configures the DGPU 144 to render all of the pixels in the display surface 400 using the 100% clip rectangle 410.

As shown, the clip rectangles 430 and 450 are centered within the display surface 400 (taking into account tile boundaries). In alternate embodiments, the orientation of the clip rectangles may be assigned in any technically feasible fashion. For example, the IGPU 84% clip rectangle 430 may be aligned to the right hand side of the display surface 400 or to the bottom of the display surface 400. Furthermore, the alignment of the IGPU clip rectangle may vary by frame.

Figure 5:
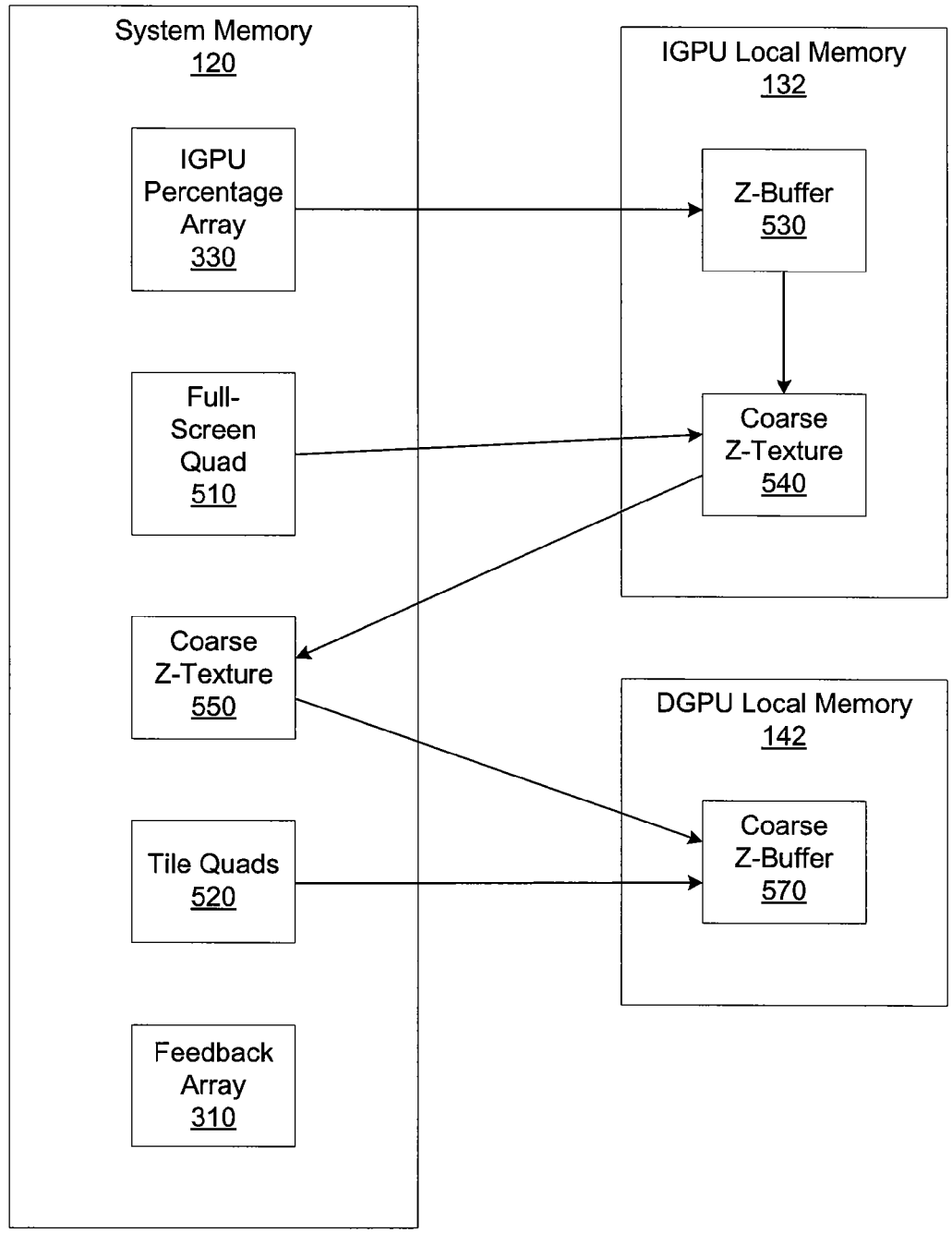
FIG. 5 is a conceptual diagram of the system memory, the IGPU local memory, and the DGPU local memory of FIG. 1, according to one embodiment of the invention.

FIG. 5 is a conceptual diagram of the system memory 120, the IGPU local memory 132, and the DGPU local memory 142 of FIG. 1, according to one embodiment of the invention. Again, the graphics driver 124 uses the system memory 120 to store data used to configure the IGPU 134 and the DGPU 144. The IGPU 134 uses the IGPU local memory 132 and the system memory 120 while pre-computing Z-values for images. Similarly, the DGPU 144 uses the DGPU local memory 142 and the system memory 120 while rendering and displaying images on the display device 150.

Before configuring the IGPU 134 and the DGPU 144, the graphics driver 124 partitions the pixels included in the two-dimensional display surface of the display device 150 into contiguous, non-overlapping, M-by-N rectangular tiles of pixels. As set forth in greater detail herein, the resolution of the display surface and the tile size determine the number of Z-values that the DMA engine copies from the IGPU local memory 132 to the system memory 120. Again, the tile size may be chosen in any technically feasible fashion, considering factors such as the bandwidth of the system memory 120 and the performance of the DGPU 144.

To facilitate the rendering process, the graphics driver 124 generates a single full-screen quad 510 and a set of tile quads 520. The single full-screen quad 510 spans the entire two-dimensional display surface of the display device 150 and includes X and Y coordinates corresponding to the boundary of the display surface. However, the single full-screen quad 510 does not include any Z-values or color information. The graphics driver 124 stores the full-screen quad 510 in the system memory 120 and regenerates the full-screen quad 510 only when the size of the display surface changes. Similarly, for each tile in the display surface, the graphics driver 124 generates a corresponding tile quad 520 that includes X and Y coordinates that encompass the pixels included in the tile, but does not include any Z-values or color information. Together, these contiguous, non-overlapping tile quads 520 span the display surface. The graphics driver 124 stores the tile quads 520 in the system memory 120 and regenerates the tile quads 520 only when the size of the display surface, the resolution of the display surface, or the tile size changes. As disclosed previously herein, the graphics driver 124 also allocates the feedback array 310, the IGPU percentage array 330, and one or more push buffers 350.

For each frame, the graphics driver 124 first configures the IGPU 134 to write a time stamp indicating an IGPU frame start time to the feedback array 310. The graphics driver 124 then configures the graphics pipeline 200 in the IGPU 134 to initialize the Z-values for all of the pixels in the display surface to the Z-clear value. More specifically, the graphics driver 124 defines a clip rectangle encompassing the entire display surface, and then sets the Z-value for each of the pixels within the clip rectangle to the Z-clear value. The graphics driver 124 further configures the IGPU 134 to render only Z-values (ignoring all color information) for a portion of the image. The graphics driver 124 designates the portion of the image to Z-render using an IGPU clip rectangle that encompasses the frame-specific IGPU percentage of pixels in the display surface. While rendering, the IGPU 134 maintains the minimum Z-value, which corresponds to the closest depth of field value, for each pixel in the IGPU clip rectangle in a Z-buffer 530. Ignoring the color information allows the IGPU 134 to efficiently pre-compute the Z-buffer 530 for the portion of the image within the IGPU clip rectangle. The IGPU 134 stores the Z-buffer 530 in the IGPU local memory 132. Since the Z-buffer 530 contains a Z-value for each pixel (although pixels outside the IGPU clip rectangle are set to Z-clear), the resolution of the Z-buffer 530 corresponds to the resolution of the display surface.

After the IGPU 134 has created the Z-buffer 530 corresponding to a frame, the graphics driver 124 re-configures the graphics pipeline 200 in the IGPU 134 to down-sample the Z-buffer 530. The graphics driver 124 sets the render-target of the IGPU 134 to a coarse Z-texture 540 with a horizontal resolution that is a factor of M smaller than the resolution of the display surface and a vertical resolution that is a factor of N smaller than the vertical resolution of the display surface. Further, the graphics driver 124 configures the IGPU 134 to process the Z-buffer 530 as an input texture, such that the IGPU 134 processes each Z-value included in the Z-buffer 530 as if the Z-value were a color. The graphics driver 124 then configures the IGPU 134 to render the full-screen quad 510 onto the coarse Z-texture 540. Again, the X and Y coordinates of the four vertices of the full-screen quad 510 specify the boundary of the display surface.

While rendering, for each M-by-N group of pixels in a tile, the fragment shading engine 212 within the IGPU 134 scans the corresponding Z-values in the Z-buffer 530, determines the maximum of these Z-values, and writes the maximum Z-value to a texel in the coarse Z-texture 540. For example, if the tile size is sixteen-by-sixteen, then each texel in the coarse Z-texture 540 represents the maximum of 256 different Z-values in the Z-buffer 530. In this fashion, each texel in the coarse Z-texture 540 is assigned a Z-value for a particular tile in the display surface. The IGPU 134 maintains the coarse Z-texture 540 in the IGPU local memory 132. However, after the IGPU 134 has rendered the full-screen quad 510, the IGPU 134 uses the DMA engine to copy the coarse Z-texture 540 in the IGPU local memory 132 to the coarse Z-texture 550 in the system memory 120. Copying the pre-computed Z-values to the system memory 120 allows the DGPU 144 to access the pre-computed Z-values stored in the coarse Z-texture 550. The graphics driver 124 then configures the IGPU 134 to write a time stamp indicating an IGPU frame finish time to the feedback array 310.

After the IGPU 134 has created the coarse Z-texture 550 corresponding to the frame, the graphics driver 124 configures the graphics pipeline 200 in the DGPU 144 to construct a coarse Z-buffer 570 by up-sampling the pre-computed Z-values in the coarse Z-texture 550. First, the graphics driver 124 configures the DGPU 144 to write a time stamp indicating a DGPU frame start time to the feedback array 310. The graphics driver 124 then sets the render-target of the DGPU 144 to a coarse Z-buffer 570 which has the same resolution as the display surface. Further, the graphics driver 124 configures the DGPU 144 to write only Z-values (i.e., not to execute any color writes) and to execute a "smart clear," thereby clearing any existing Z information that may be present in the coarse Z-buffer 570. As is known to persons skilled in the art, clearing the existing Z information enables the DGPU 144 to fully exploit existing Z-buffer compression techniques to generate and, subsequently, access the coarse Z-buffer 570. The graphics driver 124 then configures the DGPU 144 to render the tile quads 520, using the coarse Z-texture 550 to supply the Z-values for the tiles quads 520. For each tile quad 520, the vertex shading engine 204 within the DGPU 144 may use any technically feasible method to determine the location of the appropriate Z-value within the coarse Z-texture 550. Since the X and Y coordinates of each of the vertices of the tile quad 520 all map to the same texel in the coarse Z-texture 550, the X and Y coordinates of any of the four vertices may be used to determine the location of the appropriate Z-value. For example, the vertex shading engine 204 may use the X and Y coordinates of the first vertex of the tile quad 520 to determine the location of the appropriate Z-value within the coarse Z-texture 550. Subsequently, the vertex shading engine 204 uses this location to fetch the appropriate pre-computed Z-value from the coarse Z-texture 550. Again, there is a one-to-one correspondence between the M-by-N tiles of pixels, the tile quads 520, and the texels in the coarse Z-texture 550. For example, if a display surface has a resolution of 1600-by-1200 pixels and the tile size is sixteen-by-sixteen, then the graphics driver 124 partitions the display surface into 750 tiles, the graphics driver 124 generates 750 tile quads 520, and the coarse Z-texture 550 contains 750 texels.

For each tile quad 520, as the DGPU 144 renders the particular tile quad 520 to the coarse Z-buffer 570, the vertex shading engine 204 within the DGPU 144 applies the pre-computed Z-value that the DGPU 144 fetched from the coarse Z-texture 550 to each of the four vertices of the tile quad 520. Subsequently, the rasterizer 210 within the DGPU 144 converts the tile quad 520 into an M-by-N tile of pixels, assigning the Z-value associated with the tile quad 520 to each of the M-by-N pixels. Since the DGPU 144 maintains the Z-value for each of the pixels in the coarse Z-buffer 570, rendering the tile quads 520 in this fashion enables the DGPU 144 to create the coarse Z-buffer 570 using the pre-computed Z-values in the coarse Z-texture 550. Again, the X and Y coordinates of the four vertices of each tile quad 520 specify the boundary of a corresponding tile of pixels in the coarse Z-buffer 570. Advantageously, since the DGPU 144 creates the coarse Z-buffer 570, the coarse Z-buffer 570 may be built fully-compressed.

Subsequently, the graphics driver 124 re-configures the graphics pipeline 200 within the DGPU 144 to render the image frame with full shading (including color information). The DGPU 144 uses the coarse Z-buffer 570 to advantageously avoid rendering certain pixel fragments in the image that would otherwise be occluded by closer geometries in the image being rendered. Since the IGPU 134 pre-computed Z-values for a particular IGPU percentage of pixels, the corresponding coarse Z-buffer 570 enables the DGPU 144 to avoid a related number of shading operations. Finally, the graphics driver 124 configures the DGPU 144 to write a time-stamp indicating the DGPU frame finish time to the feedback array 310. Again, the graphics driver 124 uses the DGPU frame finish time, the DGPU frame start time, the IGPU frame finish time, and the IGPU frame start time to intelligently distribute the work load between the IGPU 134 and the DGPU 144 for one or more subsequent frames.

In alternate embodiments, the display surface may have any resolution and the tile size may be chosen to be any value. Therefore, the resolution and composition of the Z-buffer, the coarse Z-texture, and the coarse Z-buffer may vary.

Figure 6:
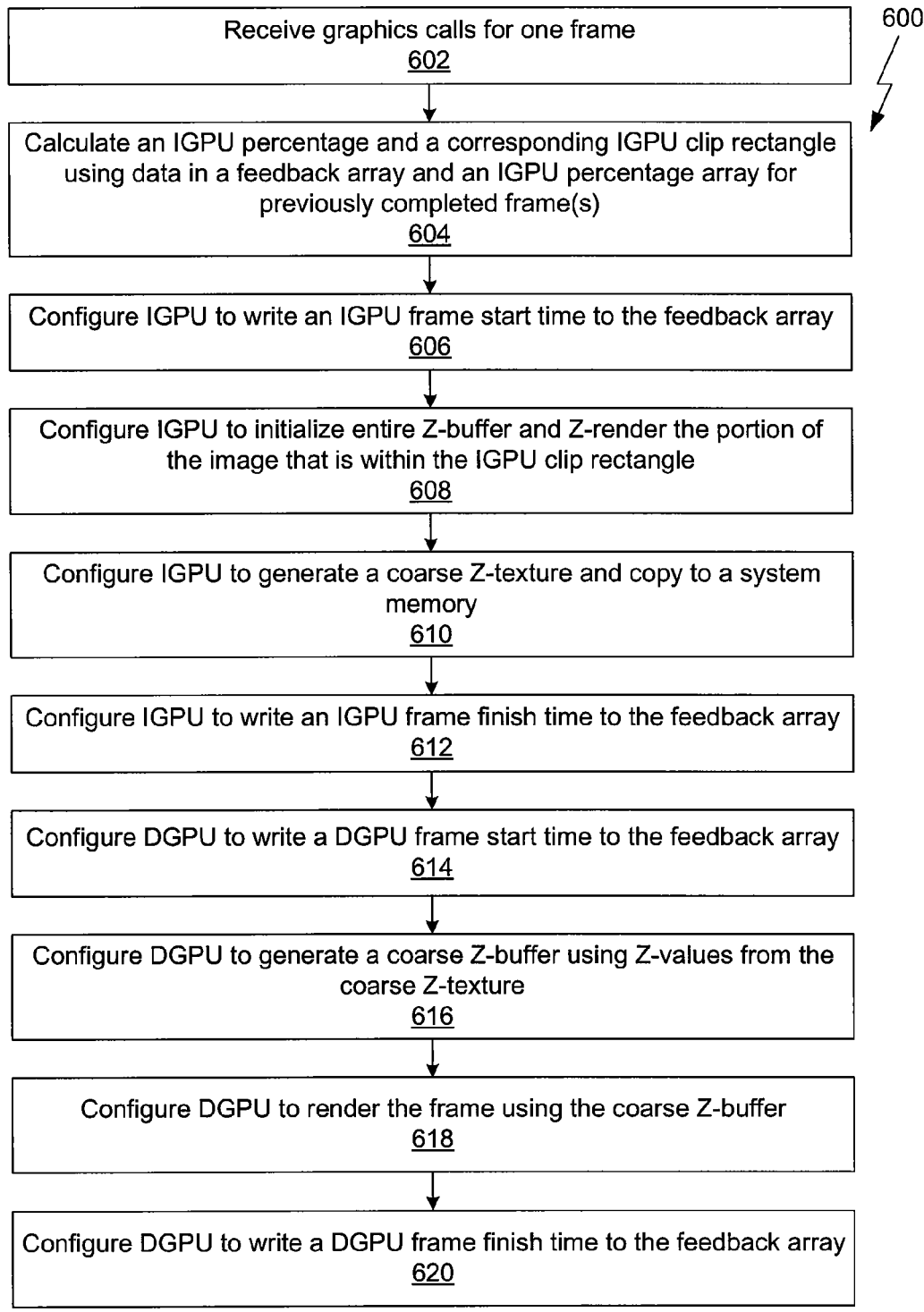
FIG. 6 is a flow diagram of method steps for pre-computing and transferring Z-values between GPUs for a frame, according to one embodiment of the invention.

FIG. 6 is a flow diagram of method steps for pre-computing and transferring Z-values between GPUs for a frame, according to one embodiment of the invention. Although the method steps are described in conjunction with the systems for FIGS. 1-3 and FIG. 5, persons skilled in the art will understand that any system that performs the method steps, in any order, is within the scope of the invention.

As shown, the method 600 begins at step 602, where the graphics driver 124 receives graphics calls emitted by the application programs 122 for one frame. At step 604, the graphics driver 124 calculates an IGPU percentage for the frame using data in the feedback array 310 and the IGPU percentage array 330 for one or more previously completed frames. As part of step 604, the graphics driver 124 computes an IGPU clip rectangle that encompasses the IGPU percentage of pixels in the display surface, and writes the IGPU percentage to the IGPU percentage array 330. Again, to optimize the performance of the IGPU 134, the graphics driver 124 reduces the IGPU percentage and, therefore, the size of the IGPU clip rectangle to encompass whole tiles.

At step 606, the graphics driver 124 configures the IGPU 134 to write an IGPU frame start time to the feedback array 310. At step 608, the graphics driver 124 configures the IGPU 134 to initialize all of the values in the Z-buffer 530 to Z-clear, and to Z-render (i.e., render Z-values to the Z-buffer 530, but ignore all color information) the portion of the image that is within the IGPU clip rectangle. Advantageously, by configuring the IGPU 134 to Z-render a specific portion of the image, the graphics driver 124 dynamically controls the loading of the IGPU 134. A series of method steps that the IGPU 134 executes to pre-compute the frame-specific number of Z-values is described in greater detail below in conjunction with FIG. 7. At step 610, the graphics driver 124 configures the IGPU 134 to generate the coarse Z-texture 540 in the IGPU local memory 132 by down-sampling the Z-buffer 530. The graphics driver 124 then configures the IGPU 134 to use a DMA engine to copy the coarse Z-texture 540 in the IGPU local memory 132 to the coarse Z-texture 550 in the system memory 120. Again, the coarse Z-texture 540 is a factor of M-by-N smaller than the corresponding Z-buffer 530. Therefore, copying the coarse Z-texture 540 uses less system memory bandwidth than copying the entire Z-buffer 530. At step 612, the graphics driver 124 configures the IGPU 134 to write an IGPU frame finish time to the feedback array 310.

At step 614, the graphics driver 124 configures the DGPU 144 to write a DGPU frame start time to the feedback array 310. At step 616, the graphics driver 124 configures the DGPU 144 to generate a coarse Z-buffer 570 by applying the Z-values in the pre-computed coarse Z-texture 550 to the tile quads 520. Again, since the DGPU 144 generates the coarse Z-buffer 570 instead of using a DMA engine to fetch a Z-buffer, the DGPU 144 may use any existing Z-buffer compression techniques to both build and access the coarse Z-buffer 570. At step 618, the graphics driver 124 configures the DGPU 144 to fully render and display the image, using the coarse Z-buffer 570 to avoid rendering certain pixel fragments in the image that would otherwise be occluded by closer geometries in the image being rendered. Again, by configuring the IGPU 134 to Z-render a specific portion of the image at step 608, the graphics driver 124 dynamically controls the number of shading operations that the DGPU 144 avoids at step 618. At step 620, the graphics driver 124 configures the DGPU 144 to write a DGPU frame finish time to the feedback array 310, and the method 600 terminates.

In some embodiments, the graphics driver may configure the IGPU to compute a Z-buffer that represents only the pixels within the IGPU clip rectangle and, subsequently, transfer this scaled Z-buffer directly to the DGPU. In other embodiments, the graphics driver may configure the IGPU to compute a Z-buffer and a coarse Z-texture that represent only the pixels within the IGPU clip rectangle, and add only tile quads representing the IGPU clip rectangle to the render queue of the DGPU.

Figure 7:
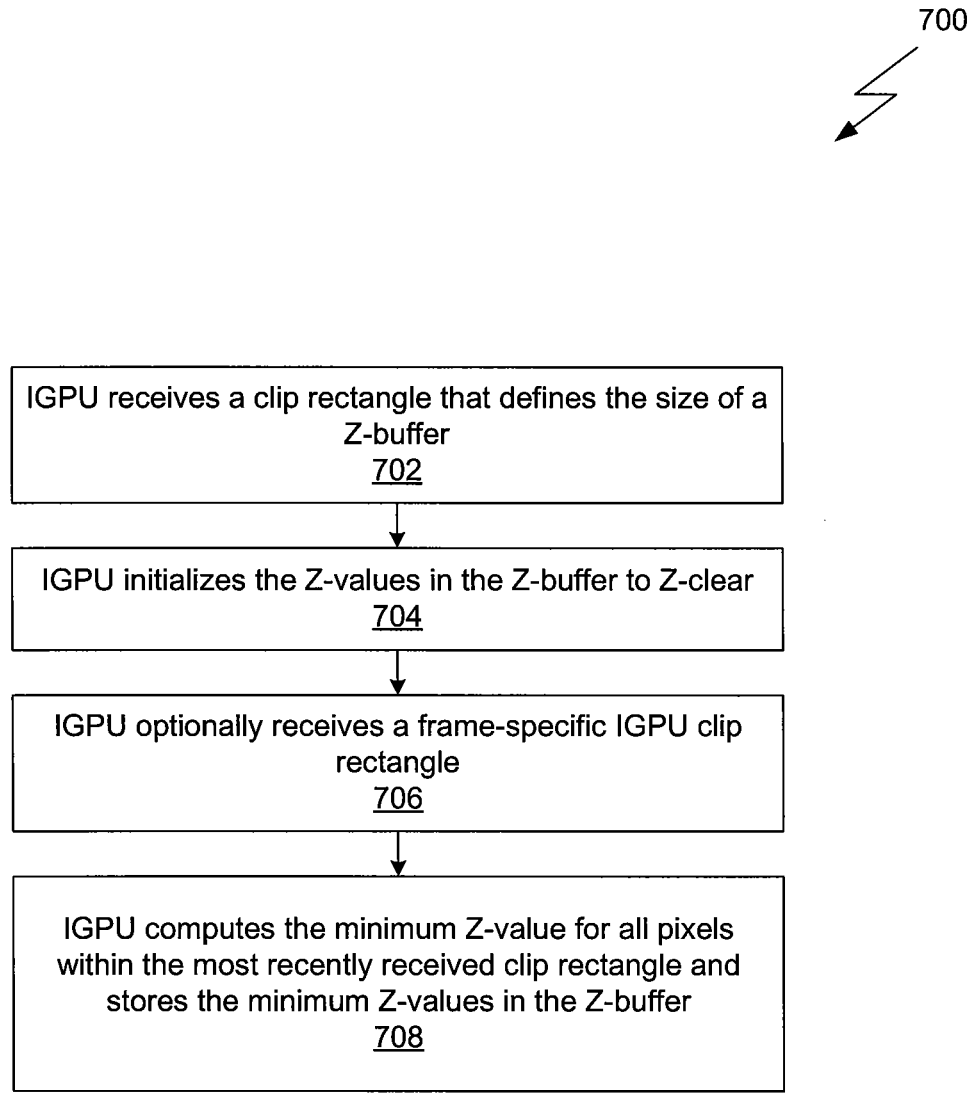
FIG. 7 is a flow diagram of method steps for pre-computing a frame-specific number of Z-values, according to one embodiment of the invention.

FIG. 7 is a flow diagram of method steps for pre-computing a frame-specific number of Z-values, according to one embodiment of the invention. Although the method steps are described in conjunction with the systems for FIGS. 1-3 and FIG. 5, persons skilled in the art will understand that any system that performs the method steps, in any order, is within the scope of the invention.

As shown, the method 700 begins at step 702, where the IGPU 134 receives a clip rectangle that defines the size of the Z-buffer 530. Typically, this clip rectangle will correspond to the boundaries of the display surface. However, in some embodiments, this clip rectangle may correspond to a frame-specific portion of the display surface. At step 704, the IGPU 134 initializes the Z-values in the Z-buffer 530 to Z-clear. At step 706, the IGPU 134 optionally receives a frame-specific IGPU clip rectangle. At step 708, the IGPU 134 Z-renders the portion of the image that is within the most recently received clip rectangle. More specifically, if the IGPU 134 received an IGPU clip rectangle at step 706, then the IGPU 134 computes the minimum Z-values for all the pixels within the IGPU clip rectangle and stores these minimum Z-values in the Z-buffer 530. However, if the IGPU 134 did not receive an IGPU clip rectangle at step 706, then the IGPU 134 computes the minimum Z-values for all the pixels represented by the Z-buffer 530 and stores these minimum Z-values in the Z-buffer 530.

In sum, a graphics driver may be configured to temporally load balance rendering operations across an IGPU and a DGPU by configuring the IGPU to pre-compute Z-values for a dynamically varying number of pixels. In one embodiment, for each frame, the graphics driver first retrieves an IGPU frame percentage from system memory. The graphics driver then configures the IGPU to write an IGPU frame start time stamp to the feedback array in system memory and to pre-compute Z-values for a rectangular portion of the display surface that spans the IGPU frame percentage of the display surface. The graphics driver further configures the IGPU to write an IGPU frame finish time stamp to a feedback array in system memory when the IGPU has finished processing the frame. The graphics driver then configures the DGPU to begin processing the frame after the IGPU has finished. More specifically, the graphics driver first configures the DGPU to write a DGPU frame start time stamp to the feedback array in system memory. Then, the graphics driver configures the DGPU to fully render the complete image using the pre-computed Z-values to avoid rendering certain pixel fragments in the image that would otherwise be occluded by closer geometries in the image being rendered. Finally, the graphics driver configures the DGPU to write a DGPU frame finish time stamp to the feedback array in system memory when the DGPU has finished rendering the image.

Using the data from the feedback array, the graphics driver determines which of the IGPU or the DGPU took longer to process the completed frame. If the IGPU took longer than the DGPU to process the completed frame, then the graphics driver calculates a new IGPU frame percentage that is less than the IGPU frame percentage for the completed frame. However, if the DGPU took longer than the IGPU to process the completed frame, and the IGPU percentage is less than one hundred percent, then the graphics driver calculates a new IGPU frame percentage that is greater than the IGPU frame percentage for the completed frame. The graphics driver writes the new IGPU frame percentage to the system memory and thereafter retrieves the new IGPU frame percentage when configuring the IGPU to pre-compute Z-values for the next frame in the rendering queue. Advantageously, this technique enables the graphics driver to intelligently re-distribute the graphics rendering operations between the IGPU and the DGPU on a per-frame basis. Consequently, the graphics driver efficiently leverages the computational power of both the IGPU and the DGPU, while reducing the likelihood of the IGPU becoming a bottleneck in the graphics pipeline.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for pre-computing a variable number of Z-values for load balancing across multiple graphics processing units (GPUs), the method comprising:

receiving one or more clip rectangles at a first GPU, wherein each clip rectangle encompasses a plurality of pixels in a frame;

Z-rendering a portion of the frame via the first GPU, wherein the boundaries of the portion of the frame are defined by the one or more clip rectangles, and a minimum Z-value is written to a Z-buffer for each pixel in the portion of the frame; and writing data to a feedback array in a system memory based on an amount of time needed to Z-render the portion of the frame by the first GPU, wherein a second GPU is configured to render the frame based on the minimum Z-values written to the Z-buffer by the first GPU and write additional data to the feedback array based on the amount of time needed to render the frame by the second GPU, and wherein the size of the portion of the frame is based on the ratio between the amount of time needed to Z-render portions of one or more previous frames by the first GPU and the amount of time needed to render the one or more previous frames by the second GPU.

2. The method of claim 1, wherein writing data to the feedback array in the system memory comprises the steps of:

writing a start time stamp to the feedback array immediately before receiving the one or more clip rectangles; and writing a finish time stamp to the feedback array immediately after Z-rendering the portion of the frame.

3. The method of claim 1, wherein the step of writing data to the feedback array in the system memory comprises writing a GPU identifier to a specified location in the feedback array immediately after Z-rendering the portion of the frame.

4. The method of claim 1, wherein the portion of the frame includes all of the pixels within the frame.

5. The method of claim 1, wherein the portion of the frame excludes one or more pixels within the frame and the one or more pixels correspond to one or more tiles within the frame such that the portion is defined along tile boundaries.

6. The method of claim 1, wherein the portion of the frame is centered within the frame.

7. The method of claim 1, wherein the step of receiving the one or more clip rectangles comprises receiving one clip rectangle that defines both the size of the Z-buffer and the boundaries of the portion of the frame.

8. The method of claim 1, wherein the step of receiving the one or more clip rectangles comprises the steps of:
- receiving a first clip rectangle that defines both the size of the Z-buffer and the boundaries of the frame; and
- receiving one or more IGPU clip rectangles that define the boundaries of the portion of the frame.

9. The method of claim 8, further comprising the step of writing an initial value to the Z-buffer for each pixel encompassed by the first clip rectangle.

10. The method of claim 9, wherein the initial value is a Z-clear value that represents the farthest possible depth of field value.

11. The method of claim 1, wherein the step of Z-rendering the portion of the frame further comprises down-sampling the Z-buffer to create a coarse Z-texture that is a factor of M-by-N smaller than the Z-buffer, and wherein rendering the frame via the second GPU comprises generating a coarse Z-buffer in a local memory associated with the second GPU by up-sampling the coarse Z-texture.

12. A graphics processing unit (GPU) adapted to be connected to a motherboard of a computing device and configured to:
- receive one or more clip rectangles at the GPU, wherein each clip rectangle encompasses a plurality of pixels in a frame;
- Z-render a portion of the frame via the GPU, wherein the boundaries of the portion of the frame are defined by the one or more clip rectangles, and a minimum Z-value is written to a Z-buffer for each pixel in the portion of the frame; and
- write data to a feedback array in a system memory based on an amount of time needed to Z-render the portion of the frame by the GPU,
- wherein a second GPU is configured to render the frame based on the minimum Z-values written to the Z-buffer by the GPU and write additional data to the feedback array based on the amount of time needed to render the frame by the second GPU, and
- wherein the size of the portion of the frame is based on the ratio between the amount of time needed to Z-render portions of one or more previous frames by the first GPU and the amount of time needed to render the one or more previous frames by the second GPU.

13. The graphics processing unit of claim 12, wherein, to write data to the feedback array, the graphics processing unit is further configured to:
- write a start time stamp to the feedback array immediately before receiving the one or more clip rectangles; and
- write a finish time stamp to the feedback array immediately after Z-rendering the portion of the frame.

14. The graphics processing unit of claim 12, wherein the graphics processing unit is further configured to receive one clip rectangle that defines both the size of the Z-buffer and the boundaries of the portion of the frame.

15. The graphics processing unit of claim 12, wherein the graphics processing unit is configured to:
- receive a first clip rectangle that defines both the size of the Z-buffer and the boundaries of the frame; and
- receive one or more IGPU clip rectangles that define the boundaries of the portion of the frame.

16. The graphics processing unit of claim 15, wherein the graphics processing unit is configured to write an initial value to the Z-buffer for each pixel encompassed by the first clip rectangle.

17. A computing device configured to pre-compute a variable number of Z-values for load balancing across multiple graphics processing units (GPUs), the computing device comprising:
- a processing unit;
- a first GPU coupled to the processing unit;
- a second GPU coupled to the processing unit and the first GPU; and
- a system memory coupled to the processing unit that includes a software driver that configures the first GPU to:
  - receive one or more clip rectangles, wherein each clip rectangle encompasses a plurality of pixels in a frame,
  - Z-render a portion of the frame, wherein the boundaries of the portion of the frame are defined by the one or more clip rectangles, and a minimum Z-value is written to a Z-buffer for each pixel in the portion of the frame, and
  - write data to a feedback array in the system memory based on an amount of time needed to Z-render the portion of the frame,
- wherein the second GPU is configured to render the frame based on the minimum Z-values written to the Z-buffer by the first GPU and write additional data to the feedback array based on the amount of time needed to render the frame by the second GPU, and
- wherein the size of the portion of the frame is based on the ratio between the amount of time needed to Z-render portions of one or more previous frames by the first GPU and the amount of time needed to render the one or more previous frames by the second GPU.

18. The computing device of claim 17, wherein the first GPU comprises an integrated GPU (IGPU) connected to a motherboard of the computing device, and the second GPU comprises a discrete GPU (DGPU) that can be coupled to the first GPU via the motherboard.

19. The computing device of claim 18, wherein the first GPU is configured to receive one clip rectangle that defines both the size of the Z-buffer and the boundaries of the portion of the frame.

20. The computing device of claim 19, wherein the first GPU is configured to:
- receive a first clip rectangle that defines both the size of the Z-buffer and the boundaries of the frame; and
- receive one or more IGPU clip rectangles that define the boundaries of the portion of the frame.

* * * * *